United States Patent
Maisto et al.

(10) Patent No.: US 9,759,543 B2
(45) Date of Patent: Sep. 12, 2017

(54) DEVICE FOR DETECTING STRAINS AND TRANSMITTING DETECTED DATA AND METHOD FOR MANUFACTURING THE SAME

(71) Applicants: Guido Maisto, Pino Torinese (IT); Marco Bonvino, Turin (IT)

(72) Inventors: Guido Maisto, Pino Torinese (IT); Marco Bonvino, Turin (IT)

( * ) Notice: Subject to any disclaimer, the term of this patent is extended or adjusted under 35 U.S.C. 154(b) by 0 days.

(21) Appl. No.: 15/028,077

(22) PCT Filed: Oct. 10, 2014

(86) PCT No.: PCT/IB2014/065210
§ 371 (c)(1),
(2) Date: Apr. 8, 2016

(87) PCT Pub. No.: WO2015/052687
PCT Pub. Date: Apr. 16, 2015

(65) Prior Publication Data
US 2016/0238367 A1   Aug. 18, 2016

(30) Foreign Application Priority Data
Oct. 11, 2013 (IT) .............................. TO2013A0825

(51) Int. Cl.
*G01B 5/30* (2006.01)
*G01B 7/16* (2006.01)
(Continued)

(52) U.S. Cl.
CPC ................ *G01B 7/18* (2013.01); *C23C 26/00* (2013.01); *G01L 1/20* (2013.01); *G01M 5/0041* (2013.01)

(58) Field of Classification Search
CPC . G01B 7/18; C23C 26/00; G01L 1/20; G01M 5/0041
(Continued)

(56) References Cited

U.S. PATENT DOCUMENTS 9,380,834 B2 *   7/2016   Rushbrook ............ A43B 23/16
2002/0075232 A1 *  6/2002   Daum ..................... G06F 3/014
                                                                345/158
(Continued)

FOREIGN PATENT DOCUMENTS

DE    10 2006 035274 A1   2/2008
WO    2004/068095 A1      8/2004

*Primary Examiner* — Max Noori
(74) *Attorney, Agent, or Firm* — Howson & Howson LLP

(57) ABSTRACT

A device for detecting strain and transmitting detected data, as well as a method for the manufacturing of a device of the type indicated above are provided. The device can be either applied to the surface of a structure to be monitored or inserted inside the structure and it allows to reliably acquire and transmit the data relating to the strains suffered by the structure, avoiding errors due to disturbances in the positioning of the strain sensor of the device or in the electronics associated with the sensor. The device includes a middle layer, in which at least one strain sensor made by using a composite material containing electrically conductive impregnable fibers, an electronic circuit and at least an antenna are provided, and a first and a second outer layers made by using a composite material containing electrically insulating impregnable fibers, between which the middle layer is placed.

13 Claims, 1 Drawing Sheet

(51) Int. Cl.
 *G01M 5/00* (2006.01)
 *G01L 1/20* (2006.01)
 *C23C 26/00* (2006.01)

(58) Field of Classification Search
 USPC .................................................. 73/760, 775
 See application file for complete search history.

(56) References Cited

U.S. PATENT DOCUMENTS

| | | |
|---|---|---|
| 2006/0021378 A1 | 2/2006 | Schmidt |
| 2007/0040702 A1* | 2/2007 | Mosher .................... B64G 1/10 340/943 |
| 2007/0273394 A1* | 11/2007 | Tanner ................. A01G 25/167 324/664 |
| 2008/0143216 A1 | 6/2008 | Berkcan et al. |
| 2009/0007686 A1* | 1/2009 | Sumigawa ............... G01B 7/16 73/777 |
| 2010/0224998 A1* | 9/2010 | Duvall ................. H01L 21/288 257/767 |
| 2014/0366650 A1* | 12/2014 | Thillainadarajah .... A63B 69/36 73/862.625 |

* cited by examiner

DEVICE FOR DETECTING STRAINS AND TRANSMITTING DETECTED DATA AND METHOD FOR MANUFACTURING THE SAME

TECHNICAL FIELD

The present invention relates to a device for detecting strain and transmitting detected data. More particularly, the present invention relates to a device for detecting the strains that appear in a structure as a result of an applied load.

The present invention further relates to a method for the manufacturing of a device of the above-mentioned type.

PRIOR ART

The possibility of detecting and monitoring the strains of a structure is of primary importance in a large number of different technical fields, among which the building industry, the automotive industry, the nautical sector, the aeronautical sector and so on can be mentioned by way of non-limiting examples.

According to prior art, the detection of strains is achieved by using sensors that are either externally applied to the structure to be monitored or inserted inside the structure itself.

Both these solutions, however, are subject to severe limitations.

In the case of sensors externally applied to a structure, strain gauges that are applied by gluing to the surface of the structure to be monitored are usually employed. Among the drawbacks of this solution it is possible to highlight the following:
the sensors are exposed to atmospheric agents;
the application process by gluing the sensor(s) to the structure is laborious and difficult;
the adhesion of the sensor(s) to the structure is subject to a fairly rapid deterioration over time, partly because of the above-mentioned atmospheric agents, with a consequent loss of reliability of the collected data;
an accurate and reliable monitoring of the strains that appear in the structure would require a very large number of sensors; however, the wire connections between the sensors and the corresponding reading instruments drastically limit the number of sensors that can be realistically used;
if strain gauges made of metal alloys (in particular constantan, a copper-nickel binary alloy) are used, the structural fragility of these gauges limits their size, thereby limiting the area on which the strains are detected.

In the case of sensors inserted inside the structure itself, it is preferred to employ optical fiber sensors with Bragg gratings rather than strain gauges. Such solution, too, involves several drawbacks, among which it is possible to mention the following:
said optical fiber sensors are very expensive;
said optical fiber sensors affect the state of strain of the structure within which they are inserted, thereby altering the detected values;
as said optical fiber sensors are to be connected with a wire connection to the respective reading instruments, the wires and cables coming out from the structure create communication paths between the outside and the inside of the structure itself, favoring, for instance, the ingress of moisture;
the provision inside the structure of seats for the insertion of said optical fiber sensors create a discontinuity in the properties of structural strength of the structure, which is likely to lead to points or lines of fracture;
the inclusion of such sensors inside a structure requires careful engineering, since the detection points must be selected and determined at the design stage, as it is not possible to move them at a later stage, and the physical characteristics of the structure will suffer the above-mentioned changes in terms of structural strength that must be calculated in advance.

Furthermore, both kinds of known solutions described above require the use of bulky, heavy and expensive hardware systems, as well as of corresponding supplying means for electrically supplying them.

In order to overcome the above drawbacks, in more recent times composite material sensors have been developed, which contain a conductive element capable of varying its electrical resistance as a function of the dimensional variation suffered as a consequence of an applied load.

Said composite material sensors can be either externally applied to the structure to be monitored or directly inserted inside this structure.

More particularly, in order to overcome the limitations associated with the presence of wire connections between the sensors and the respective reading instruments, it has been proposed to use said composite material sensors in combination with a wireless transmission system for the detected data.

In this respect, see document WO 2004/068095.

Although theoretically the proposed solutions concerning the use of composite material sensors for detecting strains and wirelessly transmitting detected data are potentially able to provide satisfactory performance, in practice their implementation has not yet achieved the expected results in terms of feasibility and reliability of the detected data.

In fact, the practical manufacturing of a device that uses composite material sensors for the detection of strains and combines said sensors with electronics capable of remotely transmitting the detected data concerning said strains poses a series of problems—both from the mechanical point of view and from the electronic point of view—that can hardly be solved.

Such problems have so far made it impossible to obtain a device of the above-mentioned type having the characteristics of simplicity in the acquisition of data and—most importantly—reliability of the detected and transmitted data that are required for accurately monitoring strains in a structure.

Devices that can detect and monitor the strains of a structure using piezoelectric materials are also known from the state of the art.

In this respect, document US 2008/0143216 relates to a device for monitoring stresses in a structure which provides for using a layer of piezoelectric material, a plurality of electrodes connected to said layer of piezoelectric material and a plurality of layers superimposed to said layer of piezoelectric material which are made of insulating material and carry conductive connectors or conductive pads that define, within said layers, conductive paths towards the electrodes, namely selective conductive paths towards the one or the other group of electrodes, so as to properly polarize the piezoelectric material. In use, when subjected to strains, the piezoelectric material generates an electric potential between the electrodes passing through the connective connectors up to a processor.

This solution is substantially different from those illustrated above, as it measures the electrical potential generated by the piezoelectric material, instead of a change in the electrical resistance of the sensor.

Even this solution is not free from limitations, first of all the need for using piezoelectric materials, i.e. materials with a particular and specific crystal structure.

The main object of the present invention is to overcome the aforesaid drawbacks, by providing a device for detecting strains and transmitting detected data which can be either applied to the surface of a structure to be monitored or inserted inside said structure and which allows to reliably acquire and transmit the data relating to the strains suffered by said structure.

More particularly, an object of the present invention is to provide a device for detecting strains and transmitting detected data which allows a correct detection of the strains, not affected by errors due to disturbances in the positioning of the sensor.

More particularly, another object of the present invention is to provide a device for detecting strains and transmitting detected data which allows a correct transmission of the strains, not affected by errors due to disturbances in the electronics associated to the sensor.

These and other objects are achieved by the device for detecting strains and transmitting detected data and by the method for the manufacturing thereof as claimed in the appended claims.

DISCLOSURE OF THE INVENTION

The device for detecting strains and transmitting detected data comprises:
- a middle layer, in which at least one strain sensor, whose dimensional changes due to the applied load are converted into variations of its electrical resistance, an electronic circuit, which is capable of detecting said electrical resistance variations, and at least one antenna, which is capable of wirelessly transmitting to the outside the data detected by said strain sensor and processed by said electronic circuit, are provided;
- a first and a second outer layers, between which said middle layer is placed.

According to the invention, said strain sensor of said middle layer is made by using a composite material containing electrically conductive impregnable fibers and said outer layers are made by using a composite material containing electrically insulating impregnable fibers.

More particularly, said strain sensor of said middle layer is made by using a composite material consisting of an electrically insulating or electrically conductive—preferably electrically insulating—matrix in which electrically conductive impregnable fibers are inserted.

These impregnable and conductive fibers, when subjected to strains, change their electrical resistance and this variation of electrical resistance is measured.

Said outer layers are made by using a composite material consisting of an electrically insulating matrix in which electrically insulating impregnable fibers are inserted.

As a result, said outer layers are completely insulating, so that they can isolate the sensor in the middle layer from possible disturbances.

According to preferred and non-limiting embodiments of the device according to the invention, said electrically conductive impregnable fibers include carbon fibers, titanium and/or polyester fibers with deposition of a metal, for example nickel.

According to preferred and non-limiting embodiments of the device according to the invention, said electrically insulating impregnable fibers include glass fibers or polyester fibers (with no metal deposition).

According to preferred and non-limiting embodiments of the device according to the invention, the matrix with which said fibers are impregnated may consist of resins and/or glues, such as polyesters, vinyl esters, epoxy resins and/or phenolic resins.

Thanks to the fact that the strain sensor is made by using electrically conductive impregnable fibers, it is possible to manufacture strain sensors having a much larger size than conventional strain gauges, which allows to detect an average value of a strain—therefore of a stress—on a larger area of the structure to which the device is applied.

Furthermore, the geometry of the strain sensor may be designed according to a desired pattern, which allows to adapt said geometry to the specific needs in terms of strain detection.

Thanks to the fact that the outer layers of the device according to the invention are made of a composite material, the device according to the invention can be laminated on the surface of the structure to which the device is applied or within said structure, thus becoming an integral part of said structure, which solves the problems related to the loss of adhesion over time that affect prior art sensors.

The conditions set for lamination on the surface of the structure (type of used resin, vacuum conditions, temperature conditions) can be suitably chosen according to the needs of the specific application.

Moreover, the use of electrically insulating impregnable fibers, within a matrix which is also electrically insulating, for the manufacturing of the outer layers of the device according to the invention allows the application of said device to structures made of electrical conductive materials without any deterioration of the performance of the device itself in detecting the strains and transmitting the detected data.

In case the device according to the invention is applied to the surface of the structure to be monitored, said structure may be an existing structure or a new structure and it can be made of any material (wood, concrete, composite materials, and so on).

Alternatively, in the case of structures of new construction, and in particular in the case of structures made of composite material, the device according to the invention can be integrated inside the structure itself.

In this case it is possible that the outer layers of the device according to the invention are an integral part of the structure whose strains are to be detected, i.e. they are layers of the structure itself, which considerably limits the disturbances to the physical and mechanical properties of the structure generated by the introduction of said device.

Alternatively, it will be possible that the composite materials used for manufacturing the device according to the invention are as homogeneous as possible in terms of chemical and physical properties with the composite material of the structure to be monitored, always in order to limit the disturbances to the physical and mechanical properties of the structure generated by the introduction of said device.

The presence of at least one antenna in the middle layer of the device according to the invention allows to wirelessly transmit the detected data to an external reading instrument, by using for example a radio-frequency communication (RFID).

Advantageously, said at least one antenna allows to avoid the use of internal power supply means in the device according to the invention, as the energy needed for exciting the strain sensor, detecting the data and transmitting said data can be supplied from the outside, through radio-frequency.

According to a preferred embodiment, a shielding layer is coupled to the electronic circuit and to the antenna provided in the middle layer of the device according to the invention, which shielding layer allows to protect the correct radio-frequency communication between the device and the external instrument from disturbances due to eddy currents in the conductive layers of the structure to which the device is applied.

Said shielding layer is preferably made of ferritic material.

The present invention also relates to a method for manufacturing the device described above.

The method according to the invention comprises at least the steps of:
- providing at least a first outer layer, made by using a composite material containing electrically insulating impregnable fibers;
- arranging, on said first outer layer, at least one strain sensor, made by using a composite material containing electrically conductive impregnable fibers;
- placing, on said first outer layer, an electronic circuit comprising means for detecting changes in one or more electrical parameters of said strain sensor, including at least the electric resistance;
- placing, on said first outer layer, at least one antenna;
- electrically connecting said at least one strain sensor and said at least one antenna to said electronic circuit;
- covering with a second outer layer, made by using a composite material containing electrically insulating impregnable fibers.

More particularly, said strain sensor is made by using a composite material consisting of an electrically insulating or electrically conductive—preferably electrically insulating—matrix in which electrically conductive impregnable fibers are inserted.

Said first outer layer and said second outer layer are made by using a composite material consisting of an electrically insulating matrix in which electrically insulating impregnable fibers are inserted, so as to be completely insulating and able to isolate the sensor contained in the middle layer from any disturbance.

According to a preferred embodiment of the invention, a step of catalysis of the thus assembled layers is provided, preferably a step of catalysis under vacuum and at controlled temperature.

Thanks to the fact that the outer layers and the middle layer comprising the strain sensor and the electronics associated therewith are catalyzed together, the device according to the invention is realized as a single piece, which allows to avoid any displacement and/or slipping of the middle layer—or at least of the strain sensor—relative to the surrounding outer layers, thereby avoiding disturbances in the detection of data that might result from such displacement and/or slipping.

According to a possible embodiment of the invention, the step of manufacturing the strain sensor by using a composite material comprises the steps of:
- providing a layer of electrically conductive fibers;
- impregnating said layer with a resin or glue (electrically conductive or—preferably—electrically insulating);
- catalyzing;
- cutting the obtained layer according to the desired pattern.

According to an alternative embodiment of the invention, the step of manufacturing the strain sensor by using a composite material comprises the steps of:
- providing a layer of electrically conductive fibers;
- impregnating said layer with a resin or glue (electrically conductive or—preferably—electrically insulating);
- cutting the obtained layer according to the desired pattern.

In this case, the strain sensor is subjected to catalysis only after being assembled with the first and the second outer layers.

According to a further alternative embodiment of the invention, the step of manufacturing the strain sensor by using a composite material comprises the step of providing a layer of composite material comprising a matrix and electrically insulating fibers and making the electrically insulating fibers of said middle layer locally become electrically conductive by deposition of a metal (for example nickel) according to a desired pattern.

BRIEF DESCRIPTION OF THE DRAWINGS

Features and advantages of the invention will become more evident from the following detailed description of a preferred embodiment, given by way of non-limiting example with reference to the accompanying drawings, in which.

DETAILED DESCRIPTION OF A PREFERRED EMBODIMENT OF THE INVENTION

Figure 1:
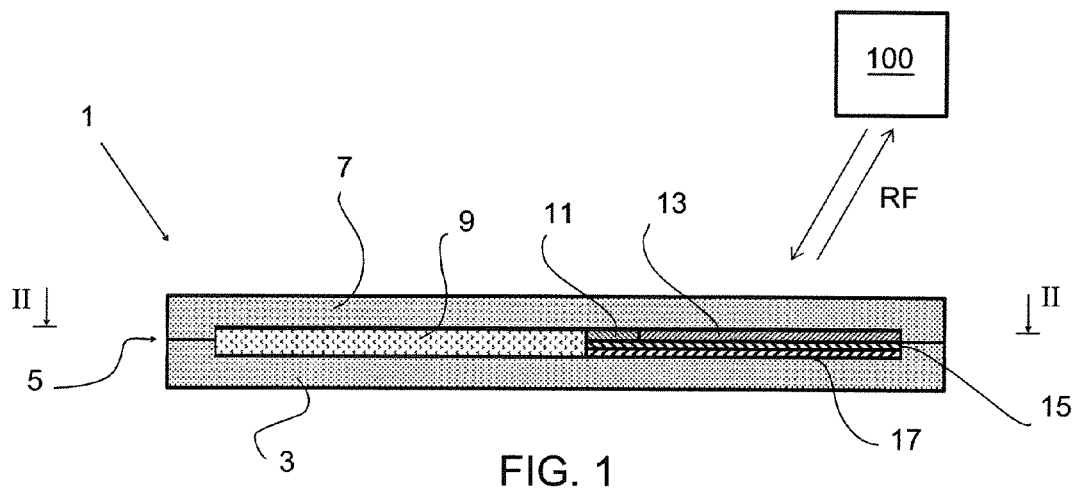
FIG. 1 schematically shows a cross-section of a device for detecting strains and transmitting detected data according to a preferred embodiment of the present invention.

With reference to FIG. 1, a device for detecting strains and transmitting detected data 1 according to the invention is shown.

According to the invention, said device comprises:
- a first outer layer 3, made of a composite material containing electrically insulating impregnable fibers, and more particularly consisting of an electrically insulating matrix containing electrically insulating impregnable fibers;
- a middle layer, indicated as a whole with reference 5;
- a second outer layer 7, made of a composite material containing electrically insulating impregnable fibers, and more particularly consisting of an electrically insulating matrix containing electrically insulating impregnable fibers.

Figure 2:
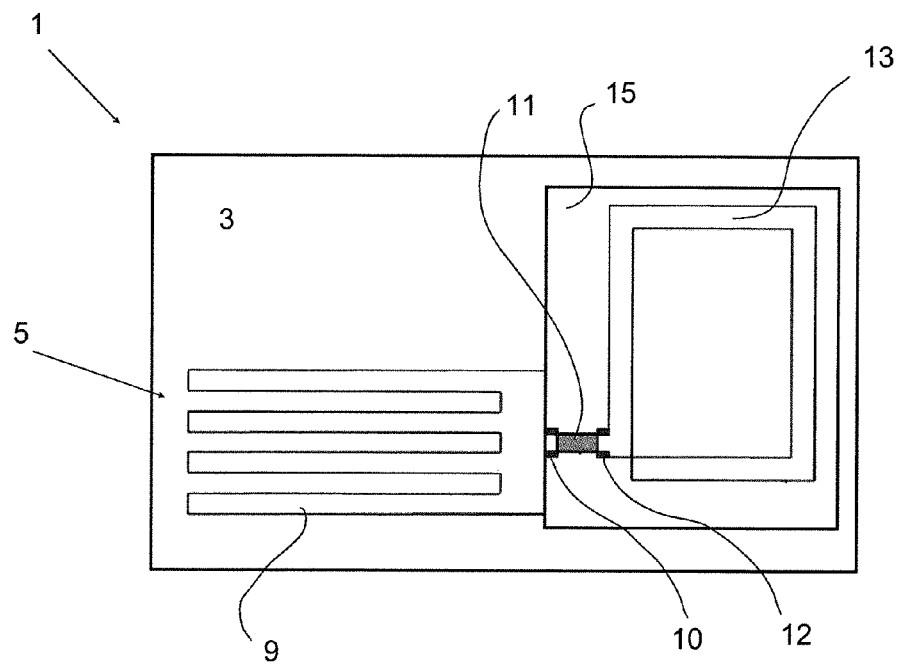
FIG. 2 schematically shows a section along the plane II-II of the device of FIG. 1.

With reference also to FIG. 2, said middle layer 5 comprises at least:
- at least one strain sensor 9, made of a composite material containing electrically conductive impregnable fibers, and more particularly consisting of a matrix—electrically conductive or electrically insulating, preferably electrically insulating—containing electrically conductive impregnable fibers, the dimensional changes (due to an applied load) of said at least one sensor being converted into variations of its electrical resistance;
- an electronic circuit 11 comprising means for detecting said variations of said electrical parameter of said strain sensor 9;
- at least one antenna 13;
wherein said at least one strain sensor 9 and said electronic circuit 11 are electrically connected at corresponding contacts or pads 10 and wherein said electronic circuit 11 and said at least one antenna 13 are electrically connected at corresponding contacts or pads 12.

The strain sensor 9 is preferably made of a composite material comprising carbon fibers, titanium fibers and/or polyester fibers with deposition of a metal (for example nickel).

Said strain sensor 9 can have the desired size and geometry; in particular it can have a size much larger than that of the strain gauges used in the prior art and its geometry can follow complex patterns.

The electronic circuit 11 and the antenna 13 can be made according to any suitable technology within the common knowledge of the person skilled in the art.

In the preferred embodiment illustrated in the Figures, said electronic circuit 11 and said antenna 13 can be implemented on a single printed circuit board (PCB) 15.

Specifically, said printed circuit board 15 is preferably made in the form of a flexible printed circuit board, made for example of a polyamide film or a synthetic fabric such as PEEK, so that the corresponding device 1 as a whole will show a certain flexibility, which will allow said device to adapt to structures with complex surfaces.

In an alternative embodiment, the antenna 13—like the strain sensor 9—may also be made of a composite material containing electrically conductive impregnable fibers, i.e. consisting of an electrically conductive or electrically insulating (preferably electrically insulating) matrix containing electrically conductive impregnable fibers. According to this embodiment, the same element made of composite material containing electrically conductive impregnable fibers can be designed to perform both the functions of strain sensor and antenna.

This solution may be advantageous when the device 1 is intended to be integrated inside a structure made of composite material, since it allows to limit the disturbance to the physical properties of the structure itself.

The middle layer 5 may also comprise one or more sensors (not shown) capable of detecting environmental conditions in the environment surrounding the device 1, such as temperature and humidity.

If provided, such additional sensors will also be electrically connected to the electronic circuit 11 by means of corresponding contacts or pads.

The electronic circuit 11 may also include a memory unit that allows to store information about the device 1 and the data detected by said device during its operation.

Specifically, said memory unit allows to permanently store in the sensor all the necessary information for interpreting the carried out measurements (including the calibration parameters of the sensor) and for identifying the sensor.

In the case of monitoring of a complex structure, which requires the use of a large number of devices 1, this greatly simplifies the management, eliminating the need to maintain specific external documentation, which is complex to manage and potentially subject to failures or losses.

Still with reference to the embodiment illustrated in the Figures, the middle layer 5 of the device 1 also comprises a shielding layer 17 associated to said middle layer 5, and in particular to the printed circuit board 15. It may be arranged, for example, below the printed circuit board 15 (as in the example of FIG. 1) or above it.

Said shielding layer 17 is preferably made of ferritic material and its function will be clear from the description of the operation of the device 1 according to the invention which is provided below.

As mentioned above, said device 1 can be applied to a new structure or to an already existing structure.

In particular, it can be laminated on said structure, so as to become an integral part thereof and avoid any deterioration in the accuracy of data detection due to a loss of adhesion.

The sensitive part of the device, consisting of the middle layer 5 that carries the strain sensor 7 and the electronic circuit 11 connected thereto, is protected from external agents by the outer layers 3, 7. In particular, said outer layers 3, 7 not only protect the middle layer 5 from the atmospheric agents, but also electrically isolate it, thanks to the fact that they are made of a composite material consisting of an electrically insulating matrix containing electrically insulating fibers, thus completely insulated from the electrical point of view.

The antenna 13 allows to communicate in a wireless way—for example through radio-frequency—with an external instrument 100.

In a particularly simple embodiment of the invention, the instrument 100 is capable of receiving data transmitted by the antenna 13. In this case, the device 1 must be provided with supplying means (batteries) for exciting the strain sensor 9 and supplying power to the electronic circuit 11.

However, in the illustrated preferred embodiment of the invention, the wireless communication between the device 1 and the instrument 100 is made in both directions, as also shown in FIG. 1.

In this way, it is possible to avoid equipping the device 1 with an internal power source, as the energy required for its operation is provided by the external instrument 100, through radio-frequency or similar wireless mode.

Therefore, when detection of strains of the structure to which the device 1 is applied is required, the external instrument 100 provides the device 1 with the energy required for exciting the strain sensor 9.

The dimensional changes suffered by said strain sensor as a consequence of the load (stress) to which it is subjected result in a corresponding variation of its electrical resistance; said variation of said electrical resistance is detected by the electronic circuit 11 and transmitted to the external instrument 100 through the antenna 13.

When additional sensors suitable for detecting environmental conditions (temperature, humidity, etc.) are provided, the data detected by said additional sensors are also processed by the electronic circuit 11 and transmitted to the external instrument 100 by the antenna 13.

It is to be noted that the excitation energy can be supplied to the strain sensor 9 at the same time as its interrogation; alternatively it is possible to provide the supplying energy to the strain sensor 9 and interrogate it at different times, providing it at the same time with means for accumulating energy (always supplied from the outside in a wireless way).

It will be evident that the operations of detection and transmission of data described above can take place either continuously or in a discrete manner, and in the latter case they can occur at regular and predetermined time intervals or upon input by the user.

The importance of providing the shielding layer 17 associated to the middle layer 5 of the device 1 according to the invention will also be evident from the foregoing description.

Since the radio-frequency communication between the device 1 and the external instrument 100 takes place at short distance, the magnetic component in the radio-frequency emission is of major importance. The presence of conductive materials (carbon, reinforced concrete, metals, and so on) in the structure to which the device 1 is applied near the antenna 13 disturbs or cancels the communication, because of eddy currents generated by the radio-frequency emission in such materials. These eddy currents in turn generate a magnetic field symmetrical and opposite to that of the radio-frequency emission, which is therefore attenuated or canceled.

In the case of the device according to the invention, the problem posed by the eddy currents is even more serious, since not only the radio-frequency communication between the antenna 13 and the external instrument 100 must be preserved from the influence of said eddy currents in order to correspondingly preserve the accuracy of the transmitted data, but it is also necessary that the external instrument 100 transmits to said device 1 enough energy for correctly exciting the strain sensor 9 without any negative influence by such eddy currents.

Hence the importance of the shielding layer 17.

As mentioned above, said shielding layer is made of ferritic material.

In this respect it is to be noted that said ferritic material should preferably be chosen on the basis of the conductive materials contained in the structure to which the device 1 is applied, so that the shielding effect is optimized according to the specific characteristics of the magnetic field generated by the eddy currents. This is possible when the final destination of the device 1—i.e. the type of structure to which it will be applied and the materials that compose such structure—is already known at the manufacturing stage.

However, in some cases it is desirable to obtain a device for detecting strains which is "universal", i.e. whose behavior is effective whatever its final destination is.

In these cases it is possible to provide for associating to the shielding layer 17 a further conductive layer (not shown) which has known characteristics and which is used for selecting the ferritic material chosen for the shielding layer 17. Said additional conductive layer can be made (for example) of carbon.

Since said conductive layer is closer to the shielding layer 17 than the conductive materials contained in the structure to be monitored, the magnetic field generated in said conductive layer is much stronger than the one generated in said structure. As a result—since the ferritic material is chosen on the basis of the characteristics of said conductive layer—the device 1 according to the invention is effectively shielded, independently from the characteristics of the structure to which it is associated.

It is clear from the above that, thanks to the structure of the device 1 according to the invention, it is therefore possible to correctly detect the strains suffered by the associated structure and remotely transmit the detected data to an external instrument 100.

The absence of wire connections allows to apply to a same structure a large number of devices for detecting strains according to the invention and ensures a considerable freedom in the choice of the positions at which said devices are placed.

It also ensures a high flexibility, as the number and position of the devices for detecting strains according to the invention can be varied over time according to the specific needs that may arise each time.

It is possible to associate a corresponding external instrument to each of the devices according to the invention (for example in the case of applications where the detection of strains has to take place in a continuous manner), or to use only a single external instrument in association with all the devices according to the invention (for example in the case of applications in which such devices are interrogated only at discrete intervals of time).

As mentioned above, the device 1 according to the invention can be made according to a method comprising at least the steps of:

preparing the first outer layer 3, made by using a composite material containing electrically insulating impregnable fibers, and more particularly consisting of an electrically insulating matrix containing electrically insulating impregnable fibers;

arranging, on said first outer layer 3, at least one strain sensor 9 made by using a composite material containing electrically conductive impregnable fibers, and more particularly consisting of a matrix—electrically conductive or electrically insulating, preferably electrically insulating—containing electrically conductive impregnable fibers;

placing, on said first outer layer 3, the electronic circuit 11 and the at least one antenna 13;

electrically connecting said electronic circuit 11 to said strain sensor 9 and to said antenna 13;

covering with the second outer layer 7, which is also made by using a composite material containing electrically insulating impregnable fibers, and more particularly consisting of an electrically insulating matrix containing electrically insulating impregnable fibers.

The different layers can be catalyzed separately or together.

According to a preferred embodiment of the invention, the layers are catalyzed together, after being assembled.

Thanks to this expedient, the different layers of the device 1 according to the invention are integrated in a single piece, which allows to avoid any slipping of the strain sensor 9 relative to the outer layers 3, 7, which could lead to errors in the strain detection during the operation of the device.

As far as the manufacturing of the strain sensor 9 is concerned, it is possible to envisage several possibilities.

According to a first option, the strain sensor 9 is obtained by the steps of:

providing a layer of electrically conductive fibers;

impregnating said layer with a resin or glue (electrically conductive or—preferably—electrically insulating);

catalyzing;

cutting the obtained layer according to the desired pattern.

The strain sensor 9 thus obtained has a large hysteresis and tends to maintain its shape when not stressed. Moreover, if the layer of impregnated fibers is catalyzed between two "peel ply" layers, after their removal it has the optimal surface for the following assembling step.

According to a second option, said strain sensor 9 is obtained by the steps of:

providing a layer of electrically conductive fibers;

impregnating said layer with a resin or glue (electrically conductive or—preferably—electrically insulating);

cutting the obtained layer according to the desired pattern.

In this case, the strain sensor 9 is arranged between the outer layers of 3, 7 without being catalyzed (so-called "fresh") and it is catalyzed only after being assembled to said outer layers.

In this way, the risk of displacement or slipping of the thus obtained strain sensor 9 relative to the outer layers during operation is completely eliminated. In this case it is preferable to provide positioning marks in the outer layers for the correct positioning of the strain sensor before catalysis.

According to a third option, the strain sensor 9 is obtained by providing a middle layer of composite material consisting of a matrix containing electrically insulating fibers and by making the electrically insulating fibers of said middle layer locally become electrically conductive by deposition of a metal according to a desired pattern.

In particular, the metal—such as nickel—is deposited on both faces of said middle layer so as to achieve the effect of electric conduction, and said middle layer is then placed between the two outer layers 3, 7.

For example, it is possible to manufacture the middle layer by using polyester fibers (as the outer layers 3,7) and subsequently deposit nickel on both faces of said middle layer according to a pattern corresponding to the desired geometry for the strain sensor.

The advantage of this solution mainly consists in the fact that the middle layer is much easier to handle as it is not complex in shape and its positioning with respect to the outer layers can take place with greater ease.

It is evident from the above description that the invention reaches the objects set forth above, as it provides a device allowing to detect strains and to transmit the detected data with high accuracy and reliability, and showing at the same time a great versatility in terms of practical applications.

It will also be evident that the embodiment described above with reference to the accompanying drawings has been given by way of example only, without any limiting purpose, and that several modifications and variations within the common knowledge of the person skilled in the art can be made without departing from the scope of protection defined by the appended claims.

The invention claimed is:

1. A device for detecting strains and transmitting detected data, comprising a first outer layer, a second outer layer and a middle layer arranged between said first outer layer and said second outer layer, wherein said middle layer comprises at least one strain sensor, at least one antenna and an electronic circuit electrically connected to said at least one strain sensor and to said at least one antenna, wherein each of said first outer layer and said second outer layer consist of a composite material consisting of an electrically insulating matrix in which impregnatable, electrically insulating fibers are contained such that said first and second outer layers completely insulate and electrically isolate the middle layer, wherein said at least one strain sensor is made of a composite material containing impregnatable, electrically conductive fibers that provide an electrical resistance which changes when subjected to strains, and wherein said electronic circuit is configured to detect and measure a change in electrical resistance of said conductive fibers.

2. The device according to claim 1, wherein said first outer layer, said second outer layer and said middle layer are catalyzed together to form a single body.

3. The device according to claim 1, wherein said electronic circuit and said antenna are arranged on a single printed circuit board, and wherein said printed circuit board is made as a flexible printed circuit board.

4. The device according to claim 1, wherein said middle layer further includes a shielding layer.

5. The device according to claim 4, wherein a further conductive layer is coupled to said shielding layer.

6. The device according to claim 1, wherein said middle layer comprises one or more sensors for detecting environmental conditions in the surroundings of said device.

7. A method for manufacturing a device for detecting strains and transmitting detected data comprising the steps of:
providing a first outer layer, made by using a composite material containing impregnatable, electrically insulating fibers;
arranging, on said first outer layer, at least one strain sensor made by using a composite material containing impregnatable, electrically conductive fibers that provide an electrical resistance which changes when subjected to strains;
placing an electronic circuit and at least one antenna on said first outer layer;
electrically connecting said at least one strain sensor and said at least one antenna to said electronic circuit, the electronic circuit being configured to detect and measure a change in electrical resistance of the conductive fibers of the at least one strain sensor; and
covering with a second outer layer, made by using a composite material containing impregnatable, electrically insulating fibers;
wherein the composite material of each of said first outer layer and said second outer layer completely insulate and electrically isolate the at least one strain sensor from external disturbances.

8. The method according to claim 7, wherein said first outer layer, said at least one strain sensor and said second outer layer, after being assembled together, are subjected to a catalysis step.

9. The method according to claim 7, wherein said at least one strain sensor is obtained by the steps of:
providing a layer of electrically conductive fibers;
impregnating said layer with a resin or a glue;
catalyzing;
cutting the layer thus obtained according to a desired pattern.

10. The method according to claim 7, wherein said at least one strain sensor is obtained by the steps of:
providing a layer of electrically conductive fibers;
impregnating said layer with a resin or a glue;
cutting the layer thus obtained according to a desired pattern;
and wherein said at least one strain sensor is subjected to catalysis only after being assembled with said outer layers.

11. The method according to claim 7, wherein said at least one strain sensor is obtained by the steps of:
providing a middle layer made of electrically insulating fibers;
impregnating said layer with a resin or a glue;
making the electrically insulating fibers of said middle layer locally become electrically conductive by deposition of a metal on said electrically insulating fibers of said middle layer, on both faces of said middle layer and according to a desired pattern.

12. The device according to claim 4, wherein said shielding layer is made of a ferritic material.

13. The device according to claim 1, wherein said middle layer comprises one or more sensors for detecting temperature and humidity in the surroundings of said device.

* * * * *